(12) United States Patent
Reeve

(10) Patent No.: US 7,900,522 B2
(45) Date of Patent: Mar. 8, 2011

(54) FLOW METER HAVING ROTOR WITH MULTIPLE FLOW CHANNELS OF DIFFERENT DIAMETER

(75) Inventor: Timothy Angus Reeve, Olds (CA)

(73) Assignee: Camino Industries Inc., Olds (CA)

( * ) Notice: Subject to any disclaimer, the term of this patent is extended or adjusted under 35 U.S.C. 154(b) by 0 days.

(21) Appl. No.: 12/279,581

(22) PCT Filed: Feb. 9, 2007

(86) PCT No.: PCT/CA2007/000215
§ 371 (c)(1),
(2), (4) Date: Dec. 29, 2008

(87) PCT Pub. No.: WO2007/093046
PCT Pub. Date: Aug. 23, 2007

(65) Prior Publication Data
US 2009/0217772 A1    Sep. 3, 2009

Related U.S. Application Data

(60) Provisional application No. 60/766,882, filed on Feb. 16, 2006.

(51) Int. Cl.
*G01F 15/00* (2006.01)
(52) U.S. Cl. ..................................................... 73/861.77

(58) Field of Classification Search ............... 73/861.77, 73/861.52; 251/6, 248
See application file for complete search history.

(56) References Cited

U.S. PATENT DOCUMENTS

| | | |
|---|---|---|
| 3,949,966 A | 4/1976 | Fabish |
| 4,148,460 A | 4/1979 | Kinsler |
| 4,440,382 A * | 4/1984 | Pruvot et al. .................. 251/248 |
| 4,546,921 A | 10/1985 | McCormack |
| 4,572,477 A | 2/1986 | Phlipot et al. |
| 4,643,215 A | 2/1987 | Phlipot et al. |
| 4,655,246 A | 4/1987 | Phlipot et al. |
| 4,723,567 A | 2/1988 | Phlipot et al. |
| 4,909,476 A | 3/1990 | Messick |
| 5,014,750 A | 5/1991 | Winchell et al. |
| 5,308,040 A | 5/1994 | Torres |
| 5,529,093 A | 6/1996 | Gallagher et al. |
| 6,053,055 A * | 4/2000 | Nelson ....................... 73/861.52 |
| 6,095,491 A * | 8/2000 | Kriesel ........................ 251/206 |
| 6,164,142 A | 12/2000 | Dimeff |
| 6,662,668 B2 | 12/2003 | Berkenbosch et al. |

* cited by examiner

*Primary Examiner* — Jewel Thompson
(74) *Attorney, Agent, or Firm* — Bennett Jones LLP

(57) ABSTRACT

A gas flow meter for obtaining flow volume readings in a gas conduit, including sensors mounted upstream and downstream of a flow restriction device on a rotor, the rotor further including at least one more flow restriction device that can be rotated into position relative to the conduit.

23 Claims, 5 Drawing Sheets

FLOW METER HAVING ROTOR WITH MULTIPLE FLOW CHANNELS OF DIFFERENT DIAMETER

FIELD OF THE INVENTION

The present invention relates to flow meters, more particularly to flow meters for use in gas lines.

BACKGROUND OF THE INVENTION

In the petrochemical industry, a gas flow meter (typically referred to as a "meter run") may be installed in a section of pipe to monitor the amount of natural gas flowing through the pipe. For gas flow meters that monitor flow volume by sensing gas pressure upstream and downstream of a flow restriction device (such as an orifice plate), the differential pressure of gas flow through the flow meter will affect the accuracy of the readings that are obtained and it has been found that the meter is most accurate at around 50%, losing accuracy when significantly above or below that level. As such, it is advantageous to be able to change the aperture size of the flow restriction device, in order to vary the gas flow through the restriction device and thereby select the desired pressure differential, without interrupting the flow of gas through the flow meter and the pipeline for a significant period of time.

SUMMARY OF THE INVENTION

According to one aspect of the present invention, there is provided a flow meter for use in a fluid conduit, including a housing, a first flow passage and a second flow passage in fluid communicating engagement with the housing, and a flow sensor disposed in each of the flow passages. The flow meter also includes a rotatable rotor enclosed at least in part by the housing and having at least two channels, each channel having a different diameter than another channel and being sealingly positionable into an operative position between the flow passages for fluid communication with the flow passages by rotation of the rotor. The flow meter also includes a rotor rotator.

In another aspect of the present invention, there is provided a flow meter for use in a fluid conduit, including a housing, a first flow passage and a second flow passage in fluid communicating engagement with the housing, and a flow sensor disposed in each of the flow passages. The flow meter also a rotatable rotor enclosed at least in part by the housing and having at least two channels, each channel having a different diameter than another channel and being sealingly positionable in an operative position between the flow passages for fluid communication with the flow passages by rotation of the rotor. The flow meter also includes positioner associated with each channel for precisely positioning a channel into the operative position, and a rotor rotator.

In yet another aspect of the present invention, there is provided a flow meter for use in a fluid conduit, including a housing, a first flow passage and a second flow passage in fluid communicating engagement with the housing, and a flow sensor disposed in each of the flow passages. The flow meter also includes a rotatable rotor enclosed by the housing and having a first rotor face and a second rotor face, at least two channels, each channel having a different diameter than another channel and being sealingly positionable between the flow passages for fluid communication with the flow passages by rotation of the rotor. The flow meter further includes a cam on the rotor proximally corresponding to each channel, each cam having a different geometry than each other cam; a latch pivotally mounted in the housing adjacent the rotor, the latch in operation being engageable with any of the cams and wherein the pivot angle of the latch in operation is unique to each cam; and a location indicator operably associated with the latch, in operation indicating the cam engaged with the latch on an outer surface of the housing.

A detailed description of some embodiments of the present invention is given in the following. It is to be understood, however, that the invention is not to be construed as limited to these embodiments.

DETAILED DESCRIPTION OF THE INVENTION

Figure 1:
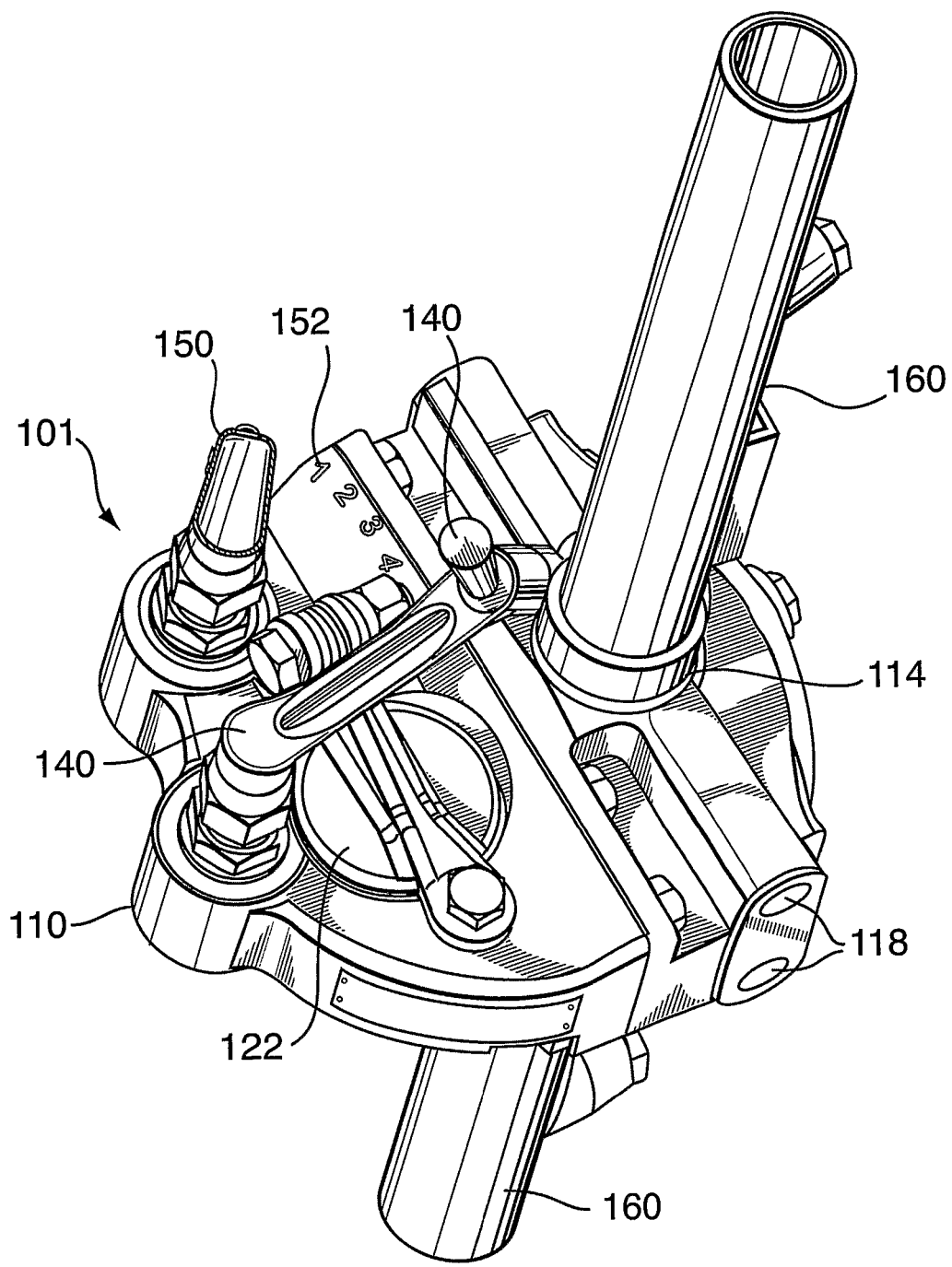
FIG. 1 is a top perspective view of a flow meter of the invention.

Referring to FIG. 1, an embodiment of the flow meter of the invention may be installed in a conduit, such as a pipeline, in order to monitor the flow of gas in the pipe. Flow meter 101 installed in conduit 160 includes housing 110, and housing 110 is in fluid communication with flow passage 114 that sealingly engages conduit 160 in fluid communication and in which sensor ports 118 may be located. Housing 110 further encloses a rotor (not shown) bearing a plurality of flow restriction channels, each of which may be rotated into alignment with conduit 160 by turning crank 140. Position pointer 150 indicates on position identifier 152 which (if any) flow restriction channel is aligned with conduit 160. Channel lid 122 may be opened if the flow restriction channels require changing or servicing. Housing 110 and most components of flow meter 101 can be made of steel, although other types of materials, metal and non-metal may be used.

Figure 2:
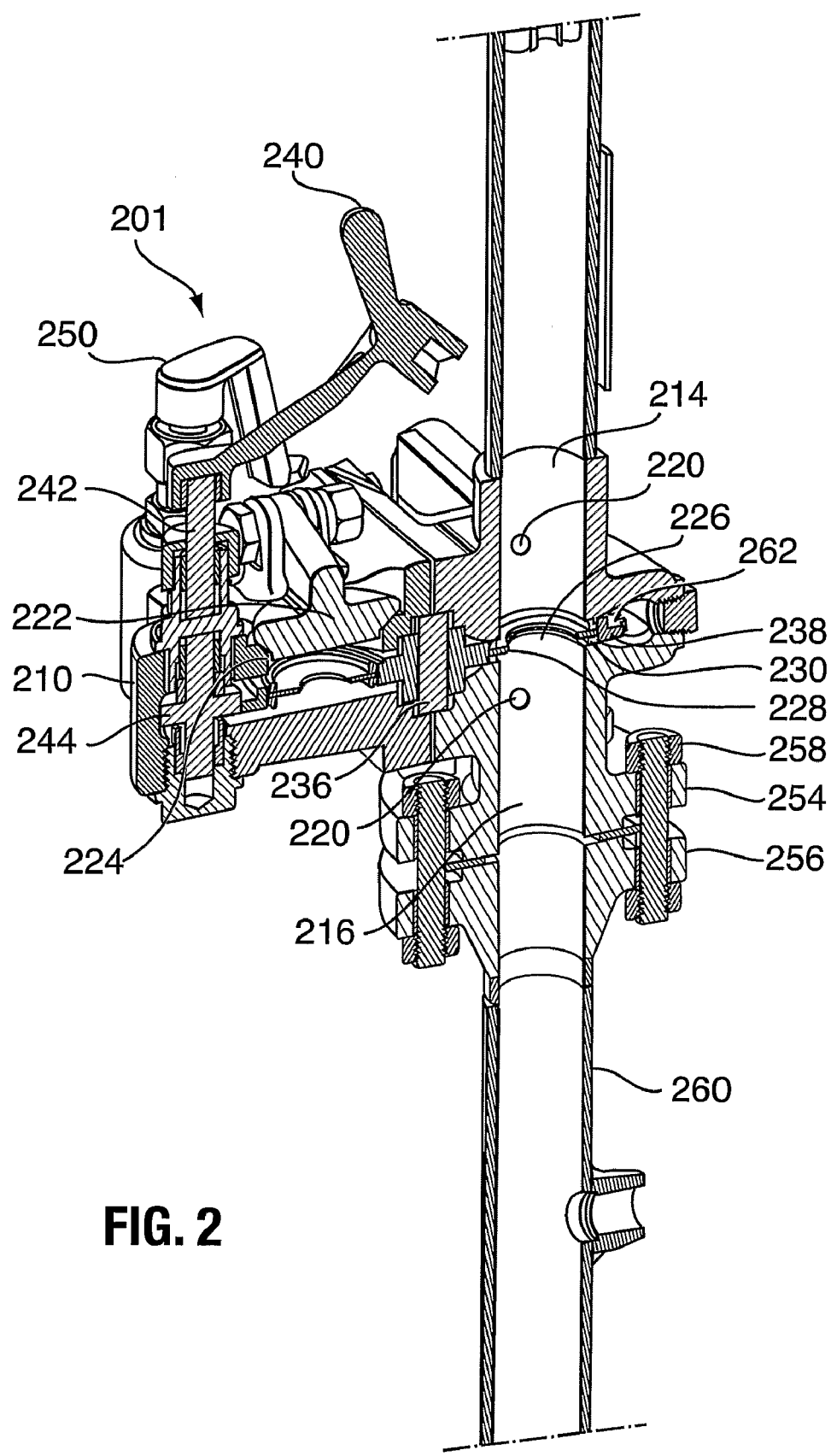
FIG. 2 is a perspective sectional view of a flow meter of the invention.

Turning now to FIG. 2, the alignment of flow channel 226 on rotor 238 with conduit 260 for operation of the flow meter 201 can be seen. Flow meter 201 is removably installed in conduit 260 by means of flanges 254, 256 and rod and bolt assembly 258. Rotor 238 includes at least two open channels 226 arranged around the axis of rotation (which in this embodiment corresponds to axial shaft 236), and the center point of each channel may be equidistant from the axis of rotation. Each of the channels 226 comprise a plate mount 230 in which an annular channel plate similar to a diaphragm 228 may be disposed; installing an annular channel plate 228 (such as o-ring assemblies marketed by Daniel) in plate mount 230 further reduces the diameter of the channel 226, which would otherwise be defined by the edge of the plate mount 230. While this arrangement offers flexibility by allowing the user to choose from a greater number of channel diameters than there are channels, by simply changing the channel plates in the plate mounts, it is to be understood that the channel mount/plate arrangement can be dispensed with and instead that the channels may themselves have pre-set diameters which differ from one another or that variable area flow restriction means (such as variable area orifice membranes) may be disposed in the channels.

Selection of flow channels 226 by rotating rotor 238 permits the user to obtain an accurate flow volume reading without having to interrupt gas flow in conduit 260 for very long and without having to remove flow meter 201 from the conduit. In operation, as rotor 238 is rotatably mounted on axial shaft 236 mounted in housing 210 and as the rotor's toothed periphery 262 is operably engaged with gear 244, turning crank 240 on the exterior of housing 210 translates the rotational movement, via crank shaft 242 and gear 244, to rotor 238, thereby moving channel 226 into or out of alignment with conduit 260. Position pointer 250 indicates which, if any, channel is in alignment with conduit 260. Any of the flow channels 226 can also be aligned with channel port 224, shown covered by lid 222, thereby enabling servicing of the flow channels, such as replacement of channel plate 228 with another channel plate of differing diameter.

When rotated into position for measuring gas flow in conduit 260, flow channel 226 aligns with flow passages 214 and 216 such that the periphery of flow channel 226 and the periphery of the flow passages 214 and 216 seal against gas leakage in order to facilitate accurate measurement. A pair of sensors 220 may be disposed in flow passages 214 and 216, one of the pair being upstream of flow channel 226 and the other being downstream of flow channel 226. While piezoelectric membrane sensors are often appropriate for flow meters, it is to be understood that other types of pressure sensors or pressure measuring means may also be used in the present device. As gas flows through conduit 260 and into housing 210, a pressure reading is taken at upstream sensor 220, after which the gas travels through flow channel 226 (which may circumscribe a narrower passage than that of either flow passages 214 and 216) and then past downstream sensor 220 at which a second pressure reading is obtained. The pressure differential between these two sensors 220 may thus be obtained, and as this pressure differential is mathematically related to a quantity of flow, flow volume can be determined from the differential pressure, using methods that are well known by those of skill in the art. If the pressure differential between these two sensors 220 is somewhere around 50%, then the user may assume that the flow quantity determination is accurate. However, if the pressure differential is substantially higher or lower than 50%, then the user may choose to increase or decrease the size of the aperture by changing to a flow channel 226 that is larger or smaller, respectively. This may be done by rotating to another flow channel 226, or if none of the flow channels 226 available on rotor 238 at that time is suitable, then the user may open lid 222 and, accessing it through channel port 224, change channel plate 228 to one with a larger or smaller central aperture.

Figure 3:
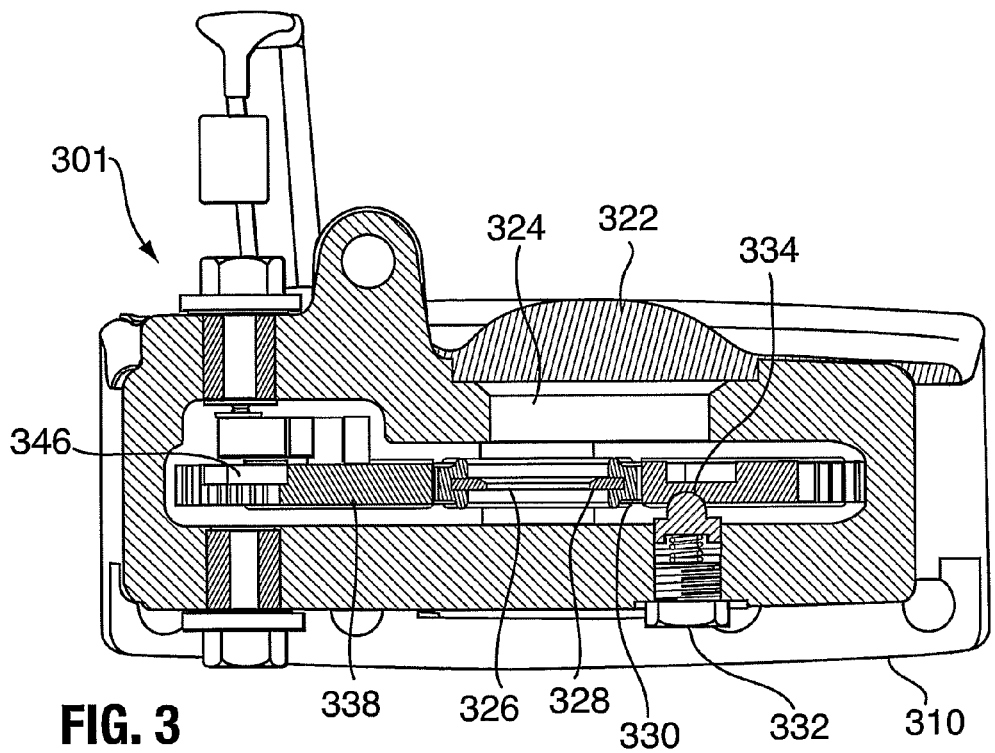
FIG. 3 is a sectional view of a flow meter of the invention.

Another factor in obtaining accurate flow volume assessments is accuracy of flow channel and flow passage alignment. Referring to an embodiment of the invention shown in FIG. 3, flow meter 301 may include a retaining pin 332 that displaceably engages a positioning bore 334 for fine-tuning the alignment of a channel with the flow passages (not shown). In the embodiment shown in FIG. 3, retaining pin 332, which is biassingly mounted in housing 310, engages positioning bore 334 as soon as the flow channel with which bore 334 is associated (not shown) moves into precise alignment with flow passages (also not shown). To allow rotation of the rotor so that another channel may be placed into the volume reading position, disengagement of retaining pin 332 from bore 334 requires slightly more force than is necessary for rotating the rotor when the retaining pin 332 is not engaged; for example, as shown in FIG. 3, the surface of retaining pin 332 which engages bore 334 may have a rounded conformation to reduce frictional forces holding pin 332 in place and thereby facilitate its displacement. This drawing and FIGS. 4 and 5 disclose embodiments in which the retaining pin is disposed in a location almost diametrically opposite the flow channel that would engage the flow passages in the volume reading position during operation of the flow meter, such that the retaining bore associated with that flow channel would actually be disposed adjacent to a diametrically opposite flow channel. However, it is to be understood the positioning pin (or other retainer) may be disposed in a different relationship to the flow passages. Further, while this embodiment illustrates using a pin and bore combination to provide precision of alignment, it would be understood by those skilled in the art that other means of precisely positioning a channel with flow passages could be used.

Another feature of the embodiment shown in FIG. 3 is the positioning of channel 326 when another channel (not shown) is properly aligned with the flow passages (not shown) for obtaining flow volume readings, as indicated by the engagement of retaining pin 332 in positioning bore 334. As channel 326 is disposed in close proximity but out of alignment with channel port 324, the user may not access channel 326 through channel lid 322, which activity could disturb the positioning of the channel through which flow volume readings are being taken (not shown) and thereby introduce error into the readings. Rather, in order for the user to access channel 326 in this embodiment of the invention, all of the channels would have to be out of alignment with the conduit. However, it is to be understood that in some embodiments it may be desirable to allow access to a channel while another channel is in position for obtaining flow volume readings; some of such embodiments may include additional stabilizing elements to prevent or counteract any disturbance of the flow channel through which the readings are being taken.

Figure 4:
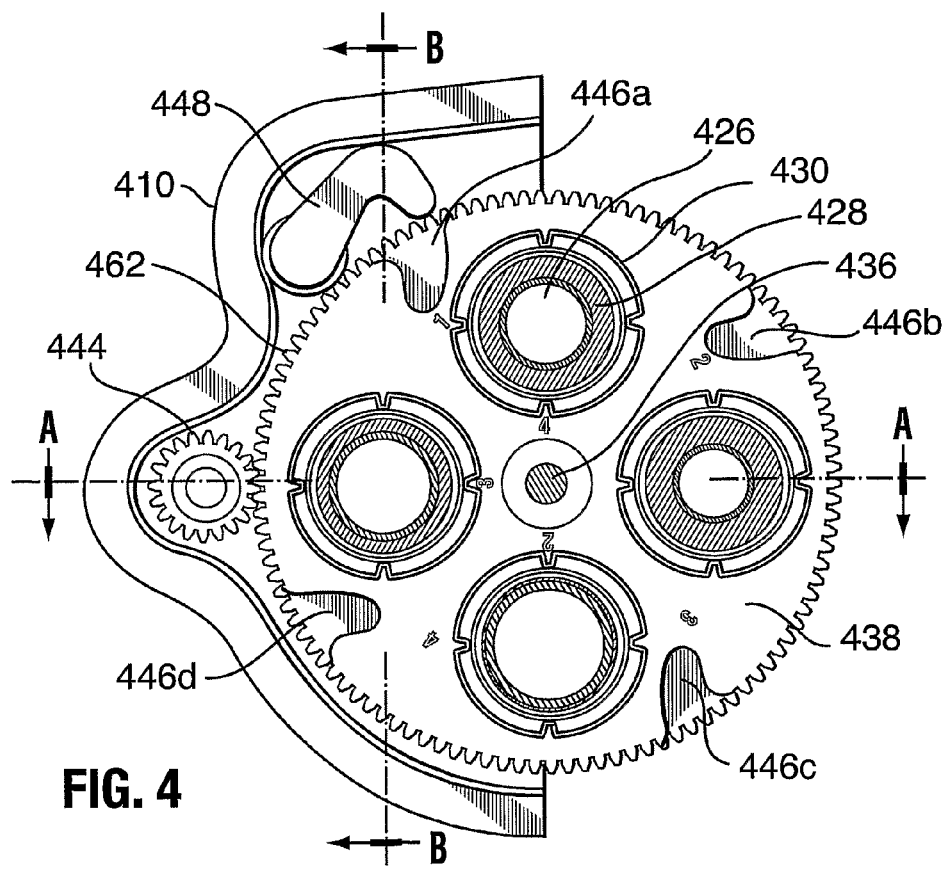
FIG. 4 is a top view of a rotor of the invention enclosed partially with the housing and with the top portion of the housing removed, line A-A' indicating the position of the section taken for FIG. 2 and line B-B' indicating the position of the section taken for FIG. 3.
Figure 5:
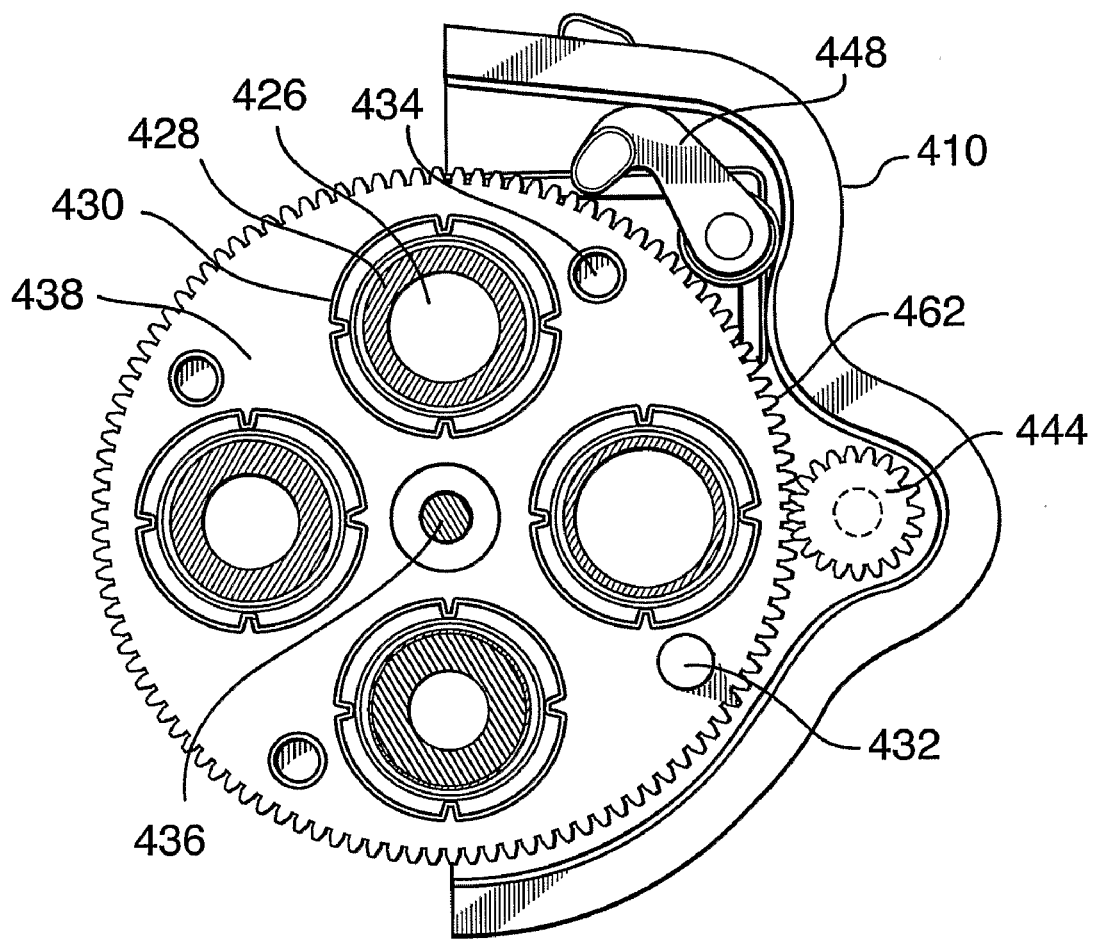
FIG. 5 is a bottom view of the rotor in FIG. 4.

As shown in FIGS. 4 and 5, an embodiment of the rotor 438 of the invention includes at least two flow channels 426 having unique diameters (which may further include annular channel plates 428 and plate mounts 430) and an axis of rotation 436. Rotor 438 may further include a positioning bore 434 associated with each flow channel which may engage a retaining pin 432, a cam 446 for each flow channel 426, each cam being engageable with a latch 448 pivotally mounted in housing 410, and a toothed periphery 462 operably associated with a gear assembly 444 for rotating the rotor. The latch 428 and cam 426 function, in one aspect, to align a flow channel with the conduit. In the embodiment shown in these drawings, cams 446a, 446b, 446c, and 446d are each shaped to engage a different proportion of pivotable latch 448. Since latch 448 thus strikes a different angular position relative to rotor 438 for engagement with each cam 446, the position pointer (not shown) that may be operably associated with latch 448 would thus point to a different spot on the housing (also not shown), which spot would be designated to identify the cam being engaged and thereby identify the flow channel which is in the volume reading position. In other embodiments, the geometry of the cams may differ from one another in angle of orientation relative to the rotor's periphery such that each cam engages the latch at a different latch pivot angle. In yet other embodiments, each cam may have a geometry corresponding to a different portion of the latch, and each said portion of the latch may be unique to each cam, with the result again that the latch engages each cam at a different latch pivot angle. While this embodiment illustrates using a latch and cam combination to align a flow channel with the conduit, and to provide an indication of the position of the rotor, it would be understood by those skilled in the art that other means of accomplishing these objectives could be used.

Moreover, since each cam 446 in this embodiment is associated not with the flow channel 426 immediately adjacent to that cam, but rather with a flow channel next to it, the positioning of latch 448 in a cam 446 does not serve to identify the flow channel 426 closest to latch 448 as being in the operative volume reading position; for example, if latch 448 is in cam 446*a*, which is designated "1" as it corresponds to the flow channel 426 that is also designated as "1", then the angular position taken by latch 448 and its associated position pointer would correspond to a spot on the housing designated at "1". This is illustrated in the embodiments shown in FIGS. 1, 2 and 6. (Of course, for embodiments in which the latch is disposed beside the flow passages, each cam could be associated with the flow channel adjacent to which it is disposed.) As is also shown in these drawings, cams 446 are present on only one face of rotor 438; this is also indicated in the embodiment shown in FIG. 3, in which cam 346 consists of a depression in one face of rotor 338 that does not extend through to the other face of rotor 338. While in some embodiments the rotor face on which the cams are disposed may also include a toothed periphery, it is to be understood that the toothed periphery of the rotor may be present on only one face of the rotor, while the periphery at the other face may include the cams.

Figure 6:
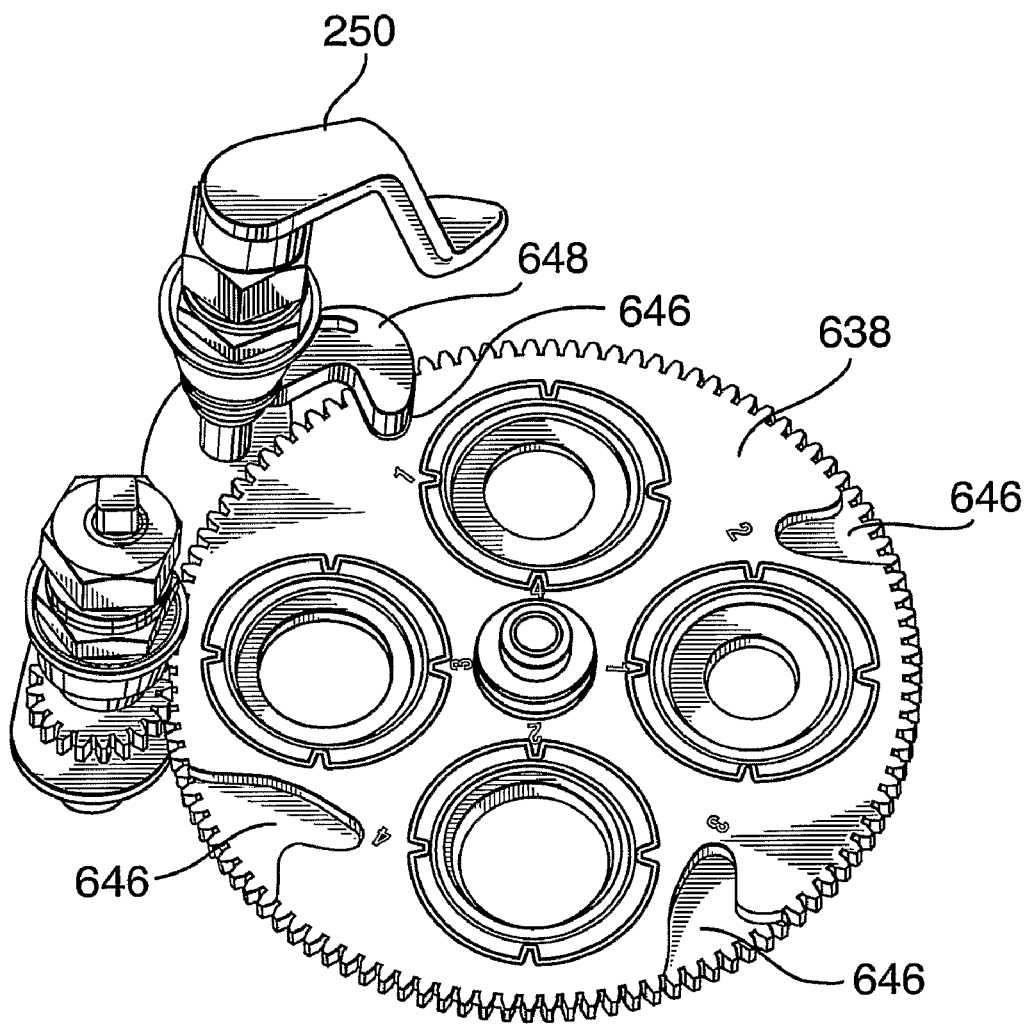
FIG. 6 is a perspective view of a rotor and latch assembly of the invention.

Further, FIG. 6 discloses an embodiment of a rotor and latch assembly of the invention showing a position pointer 650 connected to latch 648 engaged in a cam 646. As can be seen in this drawing, position pointer 650 may also function as a means of manually overriding the engagement of latch 648 and cam 646 by rotating pointer 650 away from rotor 638 until latch 648 is completely displaced from cam 646; in this connection, it can be seen in the embodiment disclosed in FIG. 1 that position pointer 150 is in the manual override position. Other embodiments of the invention may include other means of disengaging the latch from a cam.

While enclosing the entire rotor in a housing may prevent or reduce such ill effects as corrosion, fouling, or breakage of the rotor and its components, such enclosure is not necessary to the operation of the flow meter of the invention. If desired, the gear and latch arrangement may be dispensed with, along with all except the rotor, sensors, and that portion of the housing that includes the flow passages, sensors, and the rotor's axial shaft. In other words, the invention may be practised with the rotor being at least partly enclosed by the housing so that some portion of the rotor is exposed outside of the housing; in such embodiments, the rotation of the rotor may be accomplished by simply turning an exposed surface (such as the outer edge) of the rotor by hand; if a sufficient portion of the rotor surface were exposed, then a channel plate could be changed when the portion of the rotor on which it is mounted is turned to be out of the housing and the identity of the channel plate that is in alignment with the flow passages could be ascertained from an indication on the exposed portion of the rotor (thereby doing away with the need for the uniquely-shaped cams, the latch, and the position indication assembly). At a bare minimum, such embodiments of the flow meter include at least channels sealingly engageable in fluid communication with the flow passages and sensors disposed in the flow passages upstream and downstream of the channel. In those embodiments for which it is desired to prevent gas from escaping out of the housing during rotation of the rotor, the housing may be provided with a seal to engage the rotor surface and prevent gas leakage.

While particular embodiments of the present invention have been described in the foregoing, it is to be understood that other embodiments are possible within the scope of the invention and are intended to be included herein. It will be clear to any person skilled in the art that modifications of and adjustments to this invention, not shown, are possible without departing from the spirit of the invention as demonstrated through the exemplary embodiments. The invention is therefore to be considered limited solely by the scope of the appended claims.

What is claimed is:

1. A flow meter for use in a fluid conduit, comprising:
   (a) a housing having;
   (b) a first flow passage and a second flow passage in fluid communicating engagement with the housing;
   (c) a flow sensor disposed in each of the first and second flow passages;
   (d) a rotor rotatable about an axis of rotation, the rotor being at enclosed at least in part by the housing and having at least two channels, each channel being sealingly positionable in an operative position between the flow passages for fluid communication with the flow passages by rotation of the rotor, and having a different diameter than another channel;
   (e) a positioner associated with each channel for precisely positioning a channel into the operative position, wherein the positioner comprises a positioning bore on the rotor and the flow meter further comprises a biasing position retainer mounted in the housing and displaceably engaging the positioning bore of a channel when that channel is in the operative position; and,
   (f) a rotor rotator.

2. The flow meter of claim 1, wherein the plane of the rotor is, in operation, oriented substantially perpendicularly to the conduit.

3. The flow meter of claim 2, wherein the flow sensors comprise membranes.

4. The flow meter of claim 1, wherein the rotor rotator comprises at least one surface of the rotor, the at least one surface being exposed at least in part outside the housing.

5. The flow meter of claim 1, wherein the rotor rotator comprises a gear assembly operably associated with the rotor.

6. The flow meter of claim 5, wherein the rotor rotator further comprises a crank operably associated with the gear assembly.

7. The flow meter of claim 6, further comprising a channel selection indicator.

8. The flow meter of claim 1, wherein at least one channel comprises a removable annular assembly.

9. A flow meter for use in a fluid conduit, comprising:
   (a) a housing;
   (b) a first flow passage and a second flow passage in fluid communicating engagement with the housing;
   (c) a flow sensor disposed in each of the first and second flow passages;
   (d) a rotor rotatable about an axial shaft mounted in the housing, the rotor being enclosed by the housing and having:
      (i) a first rotor face and a second rotor face;
      (ii) at least two channels, each channel being sealingly positionable between the flow passages for fluid communication with the flow passages by rotation of the rotor, and having a different diameter than another channel;
      (iii) a cam proximally corresponding to each channel, each cam having a different geometry than each other cam;
   (e) a latch pivotally mounted in the housing adjacent the rotor, the latch in operation being engageable with any of the cams and wherein the pivot angle of the latch in operation is unique to each cam;
(f) a location indicator operably associated with the latch, in operation indicating the cam engaged with the latch on an outer surface of the housing.

10. The flow meter of claim 9, wherein the plane of the rotor is, in operation, oriented substantially perpendicularly to the conduit.

11. The flow meter of claim 9, wherein the flow sensors comprise membranes.

12. The flow meter of claim 9, further comprising a positioner associated with each channel.

13. The flow meter of claim 12, wherein the positioner comprises a positioning bore on the rotor and the flow meter further comprises a biasing position retainer mounted in the housing and displaceably engaging the positioning bore upon positioning of the channel in fluid communication with the flow passages.

14. The flow meter of claim 9, wherein the first rotor surface comprises a toothed periphery and the second rotor surface comprises the cams.

15. The flow meter of claim 9, further comprising a manual override element disposed on the outer surface of the housing and operably connected to the latch for disengaging the latch when engaged in the cam.

16. A flow meter for use in a fluid conduit, comprising:
(a) a housing having;
(b) a first flow passage and a second flow passage in fluid communicating engagement with the housing;
(c) a flow sensor disposed in each of the first and second flow passages;
(d) a rotor rotatable about an axis of rotation, the rotor being at enclosed at least in part by the housing and having at least two channels, each channel being sealingly positionable in an operative position between the flow passages for fluid communication with the flow passages by rotation of the rotor, and having a different diameter than another channel, wherein at least one channel comprises a removable annular assembly;
(e) a positioner associated with each channel for precisely positioning a channel into the operative position; and,
(f) a rotor rotator.

17. The flow meter of claim 16, wherein the plane of the rotor is, in operation, oriented substantially perpendicularly to the conduit.

18. The flow meter of claim 17, wherein the flow sensors comprise membranes.

19. The flow meter of claim 16, wherein the positioner comprises a positioning bore on the rotor and the flow meter further comprises a biasing position retainer mounted in the housing and displaceably engaging the positioning bore of a channel when that channel is in the operative position.

20. The flow meter of claim 16, wherein the rotor rotator comprises at least one surface of the rotor, the at least one surface being exposed at least in part outside the housing.

21. The flow meter of claim 16, wherein the rotor rotator comprises a gear assembly operably associated with the rotor.

22. The flow meter of claim 21, wherein the rotor rotator further comprises a crank operably associated with the gear assembly.

23. The flow meter of claim 22, further comprising a channel selection indicator.

* * * * *